United States Patent
Shei et al.

(10) Patent No.: US 10,670,257 B2
(45) Date of Patent: Jun. 2, 2020

(54) WATERPROOF LIGHT EMITTING MODULE

(71) Applicant: E Ink Holdings Inc., Hsinchu (TW)

(72) Inventors: Tsai-Wei Shei, Hsinchu (TW); Chih-Ching Yen, Hsinchu (TW); Hsin-Hao Jen, Hsinchu (TW); Chin-Chi Yu, Hsinchu (TW); Chih-Chun Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/572,641

(22) Filed: Sep. 17, 2019

(65) Prior Publication Data
US 2020/0011522 A1 Jan. 9, 2020

Related U.S. Application Data

(63) Continuation-in-part of application No. 15/951,189, filed on Apr. 12, 2018.

(30) Foreign Application Priority Data

Aug. 15, 2017 (CN) .......................... 2017 1 0698555

(51) Int. Cl.
*F21V 31/04* (2006.01)
*F21Y 103/10* (2016.01)
(Continued)

(52) U.S. Cl.
CPC .............. *F21V 31/04* (2013.01); *G02B 6/009* (2013.01); *F21Y 2103/10* (2016.08); *F21Y 2115/10* (2016.08)

(58) Field of Classification Search
CPC ..... F21V 31/04; G02B 6/009; F21Y 2103/10; F21Y 2115/10
See application file for complete search history.

(56) References Cited

U.S. PATENT DOCUMENTS

| 6,867,827 B2 | 3/2005 | Cha et al. |
| 7,033,063 B2 | 4/2006 | Cha et al. |
| (Continued) | | |

FOREIGN PATENT DOCUMENTS

| CN | 101017710 A | 8/2007 |
| CN | 102122463 A | 7/2011 |
| (Continued) | | |

OTHER PUBLICATIONS

Corresponding Taiwan office action dated Jan. 22, 2018.
Corresponding Taiwan office action dated Apr. 9, 2020.
Office action of U.S. Appl. No. dated Jan. 2, 2020.

*Primary Examiner* — Evan P Dzierzynski
(74) *Attorney, Agent, or Firm* — CKC & Partners Co., LLC

(57) ABSTRACT

A waterproof light emitting module includes a circuit board, a light emitting diode, a light guide plate, first, second, and third waterproof layers. The light emitting diode is over the circuit board and has a light emitting surface, and first and second non-light emitting surfaces. The light emitting surface is opposite to the first non-light emitting surface. The second non-light emitting surface is between the light emitting surface and the first non-light emitting surface. A center of the light guide plate is substantially aligned with a center of the light emitting diode along a direction perpendicular to the light emitting surface. The light emitting diode is between the first waterproof layer and the light guide plate. The second waterproof layer covers the second non-light emitting surface. The third waterproof layer is between the second waterproof layer and the light guide plate.

17 Claims, 12 Drawing Sheets

(51) Int. Cl.
*F21V 8/00* (2006.01)
*F21Y 115/10* (2016.01)

(56) References Cited

U.S. PATENT DOCUMENTS

| | | |
|---|---|---|
| 8,547,011 B2 | 10/2013 | Yamada et al. |
| 8,651,690 B2 | 2/2014 | Wu |
| 8,684,581 B2 | 4/2014 | Jeon et al. |
| 8,749,732 B2 | 6/2014 | Ji et al. |
| 8,752,274 B2 | 6/2014 | Hu et al. |
| 2013/0010495 A1* | 1/2013 | Moon .................... G02B 6/003 362/609 |
| 2014/0369067 A1* | 12/2014 | Chen .................... G02B 6/0021 362/606 |
| 2015/0155614 A1* | 6/2015 | Youn .................... H04B 1/3888 343/702 |
| 2016/0131822 A1 | 5/2016 | Tai et al. |

FOREIGN PATENT DOCUMENTS

| | | |
|---|---|---|
| CN | 102313159 B | 7/2013 |
| CN | 106097907 A | 11/2016 |
| KR | 101089791 B1 | 12/2011 |
| TW | 201415130 A | 4/2014 |
| TW | 201500815 A | 1/2015 |
| TW | I631297 B | 8/2018 |

\* cited by examiner

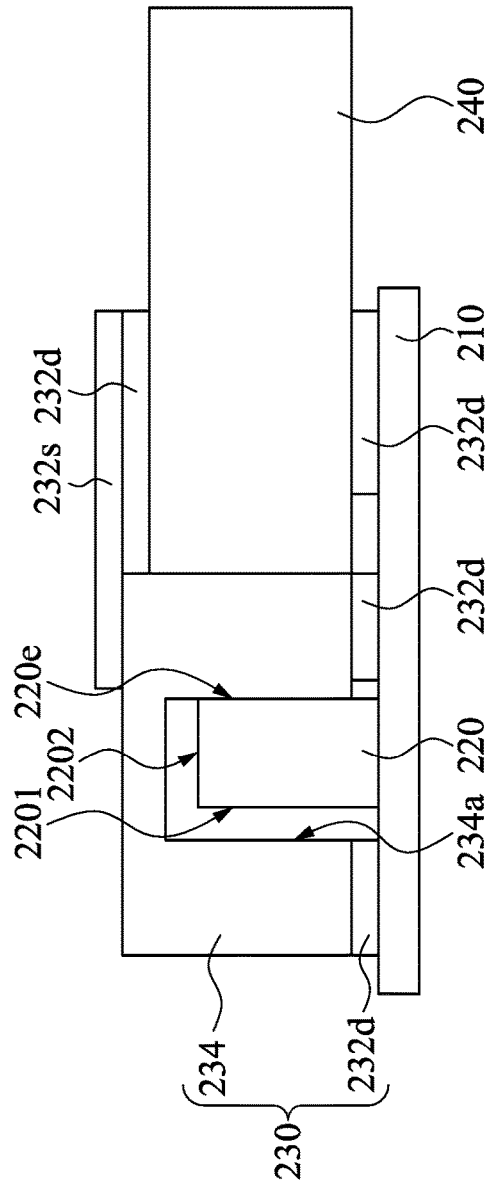
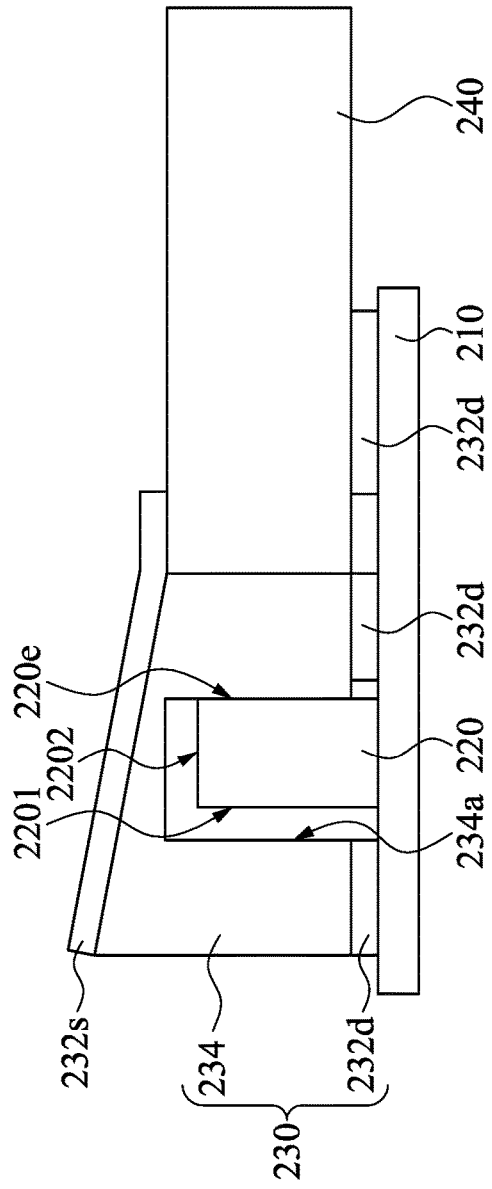

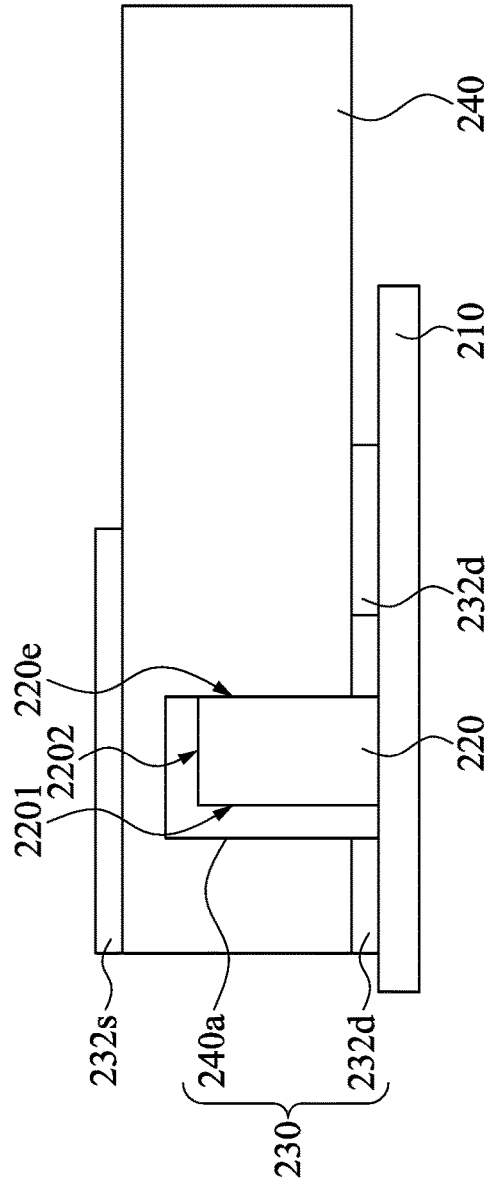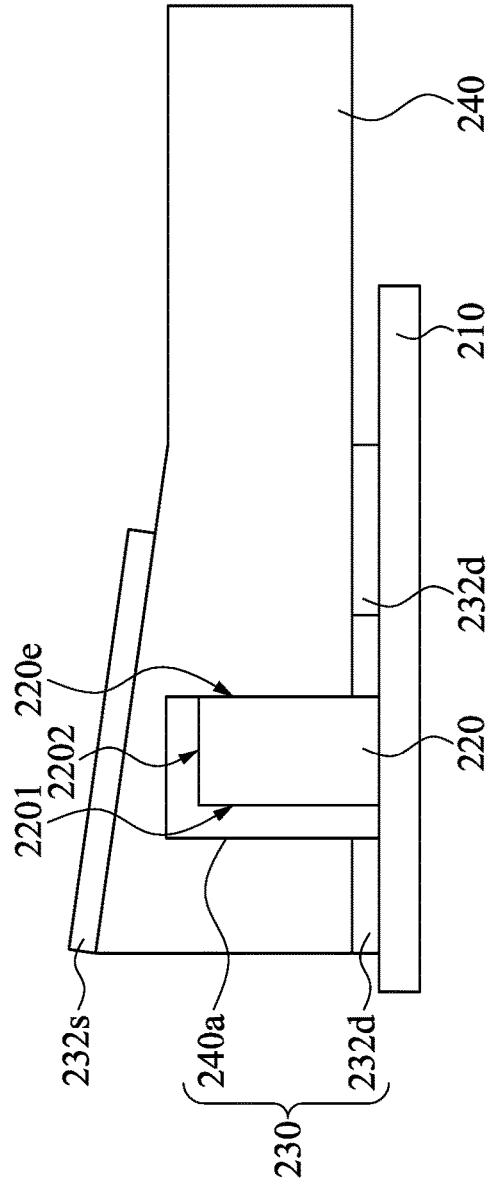

WATERPROOF LIGHT EMITTING MODULE

CROSS-REFERENCE TO RELATED APPLICATION

This application is a Continuation-in-part of U.S. application Ser. No. 15/951,189, filed on Apr. 12, 2018, which claims priority Chinese Application Serial Number 201710698555.1, filed on Aug. 15, 2017, which is herein incorporated by reference.

BACKGROUND

Field of Invention

The present disclosure relates to a waterproof light emitting module.

Description of Related Art

Most of existing light-emitting modules do not have waterproof structures, and thus are vulnerable to moisture, causing circuit short or corrosion. Therefore, how to improve the light-emitting module and the display device with the light-emitting module to have excellent waterproof property is an issue in the art.

The light-emitting module generally includes a light guide plate for receiving light from a light source arranged on a circuit board and redistributing the light more uniformly. In some cases, the light guide plate is assembled to the circuit board using a bonding material. However, in order to align a center of the light source with a center of the light guide plate to achieve optimal light utilization efficiency, a spacing between the light guide plate and the circuit board should be controlled such that the bonding material may have an insufficient thickness, which in turn fails to fix the light guide plate and the circuit board.

SUMMARY

A purpose of the present disclosure is to provide a light emitting diode device, a light emitting module and a display device with excellent waterproof property. It is possible to prevent a light emitting diode from damage due to moisture by disposing a waterproof layer covering the light emitting diode.

The present disclosure provides a waterproof light emitting diode device, which includes: a circuit board; a light emitting diode over the circuit board, and the light emitting diode having a contact; and a waterproof layer covering the contact of the light emitting diode, in which the waterproof layer includes an adhesive, a single-sided adhesive tape, a double-sided adhesive tape, a plastic substrate or a combination thereof.

According to some embodiments of the present disclosure, the light emitting diode has a light emitting surface, and the waterproof layer is not in contact with the light emitting surface.

The present disclosure provides a waterproof light emitting module, which includes: a circuit board; a light emitting diode over the circuit board, the light emitting diode having a light emitting surface, a first non-light emitting surface and a second non-light emitting surface; a light guide plate adjacent to the light emitting surface of the light emitting diode; and a waterproof layer covering the first non-light emitting surface and the second non-light emitting surface of the light emitting diode, the waterproof layer including an adhesive, a substrate, a recessed portion of the light guide plate, a portion of the circuit board or a combination thereof.

According to some embodiments of the present disclosure, the waterproof layer includes the adhesive and the substrate, and the adhesive is in contact with the circuit board and covers the first non-light emitting surface of the light emitting diode, and the substrate is in contact with the adhesive and covers the second non-light emitting surface of the light emitting diode.

According to some embodiments of the present disclosure, the waterproof layer further includes a double-sided adhesive tape, and the substrate is fixed on the light guide plate through the double-sided adhesive tape.

According to some embodiments of the present disclosure, the waterproof layer includes a single-sided adhesive tape, a double-sided adhesive tape and the substrate, and the substrate is fixed on the circuit board through the double-sided adhesive tape, and the substrate covers the first non-light emitting surface of the light emitting diode, and the single-sided adhesive tape is in contact with the substrate and covers the second non-light emitting surface of the light emitting diode.

According to some embodiments of the present disclosure, the substrate further covers the light emitting surface of the light emitting diode.

According to some embodiments of the present disclosure, the waterproof layer includes a double-sided adhesive tape and the substrate, and the substrate has a recessed portion covering the first non-light emitting surface and the second non-light emitting surface of the light emitting diode and further covering the light emitting surface, and the substrate is fixed on the circuit board through the double-sided adhesive tape.

According to some embodiments of the present disclosure, the waterproof layer includes a double-sided adhesive tape and the recessed portion of the light guide plate, and the recessed portion of the light guide plate covers the first non-light emitting surface and the second non-light emitting surface of the light emitting diode and further covers the light emitting surface, and the light guide plate is fixed on the circuit board through the double-sided adhesive tape.

According to some embodiments of the present disclosure, the waterproof layer includes a double-sided adhesive tape and the portion of the circuit board, and the portion of the circuit board covers the first non-light emitting surface and the second non-light emitting surface of the light emitting diode, and the portion of the circuit board is fixed on the light guide plate through the double-sided adhesive tape.

According to some embodiments of the present disclosure, the waterproof layer includes a double-sided adhesive tape and the substrate, and the substrate covers the first non-light emitting surface and the second non-light emitting surface of the light emitting diode and further covers the circuit board, and the substrate is fixed on the light guide plate through the double-sided adhesive tape.

The present disclosure provides a waterproof display device, which includes: the above-mentioned waterproof light emitting module; a display panel fixed on a first surface of the light guide plate; and a protective layer fixed on a second surface of the light guide plate, and the second surface being opposite to the first surface.

According to some embodiments of the present disclosure, a waterproof light emitting module includes a circuit board, a light emitting diode, a light guide plate, a first waterproof layer, a second waterproof layer, and a third waterproof layer. The light emitting diode is over the circuit board. The light emitting diode has a light emitting surface, a first non-light emitting surface, and a second non-light emitting surface. The light emitting surface is opposite to the first non-light emitting surface. The second non-light emitting surface is between the light emitting surface and the first non-light emitting surface. The light guide plate is adjacent to the light emitting surface of the light emitting diode. A center of the light guide plate is substantially aligned with a center of the light emitting diode along a direction perpendicular to the light emitting surface. The light emitting diode is between the first waterproof layer and the light guide plate. The second waterproof layer covers the second non-light emitting surface of the light emitting diode. The third waterproof layer is between the second waterproof layer and the light guide plate.

According to some embodiments of the present disclosure, the first waterproof layer is bonded to the second waterproof layer and the circuit board.

According to some embodiments of the present disclosure, the first waterproof layer is in contact with the second waterproof layer and the circuit board.

According to some embodiments of the present disclosure, the second waterproof layer overlies the first waterproof layer and the third waterproof layer.

According to some embodiments of the present disclosure, the light emitting diode is between the first waterproof layer and the third waterproof layer.

According to some embodiments of the present disclosure, the first waterproof layer is between the circuit board and the second waterproof layer.

According to some embodiments of the present disclosure, the first waterproof layer has a top surface and a bottom surface opposite to the top surface, and at least one of the top surface and the bottom surface is adhesive.

According to some embodiments of the present disclosure, the second waterproof layer has a top surface and a bottom surface opposite to the top surface. At least one of the top surface and the bottom surface is adhesive.

According to some embodiments of the present disclosure, the second waterproof layer has a top surface and a bottom surface opposite to the top surface. At least one of the top surface and the bottom surface is non-adhesive.

According to some embodiments of the present disclosure, the third waterproof layer has a top surface and a bottom surface opposite to the top surface, and at least one of the top surface and the bottom surface is adhesive.

According to some embodiments of the present disclosure, a thickness of the third waterproof layer is in a range from about 0.1 mm to about 0.3 mm.

According to some embodiments of the present disclosure, the waterproof light emitting module further includes a fourth waterproof layer below the circuit board and the light guide plate. A top surface of the fourth waterproof layer is adhered to the circuit board and the light guide plate.

According to some embodiments of the present disclosure, the waterproof light emitting module further includes a fifth waterproof layer, a sixth waterproof layer, and a seventh waterproof layer. The fifth waterproof layer is below the circuit board and the light guide plate. The sixth waterproof layer is between the circuit board and the fifth waterproof layer. The seventh waterproof layer is between the light guide plate and the fifth waterproof layer.

According to some embodiments of the present disclosure, the fifth waterproof layer has a top surface and a bottom surface opposite to the top surface. At least one of the top surface and the bottom surface is adhesive.

According to some embodiments of the present disclosure, the fifth waterproof layer has a top surface and a bottom surface opposite to the top surface. At least one of the top surface and the bottom surface is non-adhesive.

According to some embodiments of the present disclosure, the sixth waterproof layer has a top surface and a bottom surface opposite to the top surface. At least one of the top surface and the bottom surface is adhesive.

According to some embodiments of the present disclosure, the seventh waterproof layer has a top surface and a bottom surface opposite to the top surface. At least one of the top surface and the bottom surface is adhesive.

The embodiments of the present disclosure provide the waterproof light emitting module having the first waterproof layer, the second waterproof layer, and the third waterproof layer. The center (e.g., a geometric center) of the light guide plate is substantially aligned with the center (e.g., a geometric center) of the light emitting diode along the direction perpendicular to the light emitting surface such that light can be transported from the light emitting surface of the light emitting diode to the light guide plate with little or no light loss. In particular, the third waterproof layer is thick enough to provide strong adherence between the light guide plate and the second waterproof layer. The waterproof light emitting module further includes the fifth, sixth, and seven waterproof layers such that ambient moisture is prevented from passing to the third non-light emitting surface of the light emitting diode.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows:

FIGS. 5-14 are cross-sectional views of waterproof light emitting modules according to some embodiments of the present disclosure;

DETAILED DESCRIPTION

Figure 1:
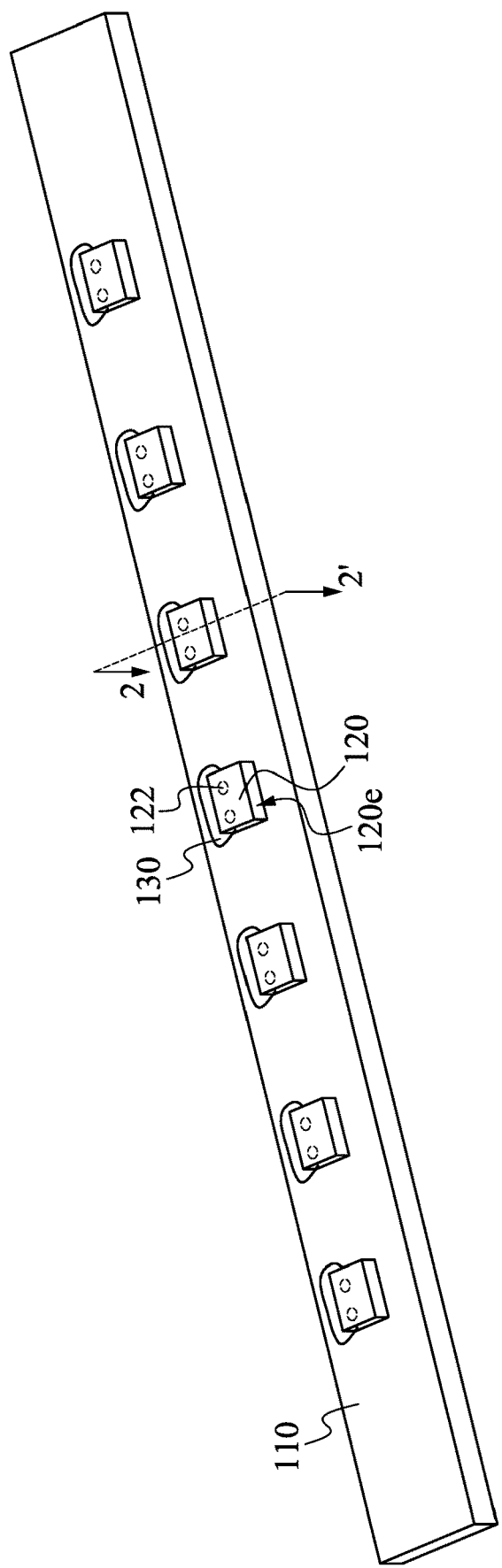
FIG. 1 is a top view of a waterproof light emitting diode device according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides a waterproof light emitting diode device. It is possible to prevent a contact of a light emitting diode from damage due to moisture by disposing a waterproof layer covering the contact of the light emitting diode. Various embodiments of the waterproof light emitting diode device will be described below in detail.

FIG. 1 is a top view of a waterproof light emitting diode device according to some embodiments of the present disclosure. The waterproof light emitting diode device includes a circuit board 110, a light emitting diode 120 and a waterproof layer 130. The waterproof light emitting diode device can also be called as a waterproof light bar. It is noted that FIG. 1 shows the waterproof layer 130 covering contacts of a single light emitting diode, but those skilled in the art can understand that the waterproof layer can be extended to cover contacts of multiple light emitting diodes.

In some embodiments, the circuit board is a flexible printed circuit (FPC), a printed circuit board (PCB) or a combination thereof.

The light emitting diode 120 is on the circuit board 110. The light emitting diode 120 may be top-emitting or side-emitting. In some embodiments, the light emitting diode is side-emitting and has a light emitting surface 120e, as shown in FIG. 1. The light emitting diode 120 has at least one contact 122. The contact 122 may also be called as a soldering point. In some embodiments, the contact 122 of the light emitting diode 120 is disposed between a bottom surface of the light emitting diode 120 and the circuit board 110.

The contact 122 includes a metal material, which is vulnerable to damage from moisture. Therefore, the present disclosure provides the waterproof layer 130 covering the contact 122 of the light emitting diode 120 to prevent the contact 122 from damage due to moisture. In some embodiments, the waterproof layer 130 includes an adhesive, a single-sided adhesive tape, a double-sided adhesive tape, a plastic substrate or a combination thereof. In some embodiments, the plastic substrate includes polyimide (PI), polyethylene terephthalate (PET), Teflon, liquid crystal polymer (LCP), polyethylene (PE), polypropylene (PP), polystyrene (PS), polyvinyl chloride (PVC), Nylon or polyamides, polymethylmethacrylate (PMMA), acrylonitrile-butadiene-styrene (ABS), phenolic resins, epoxy, polyester, silicone, polyurethane (PU), polyamide-imide (PAI) or a combination thereof, but not limited thereto.

Figure 2:
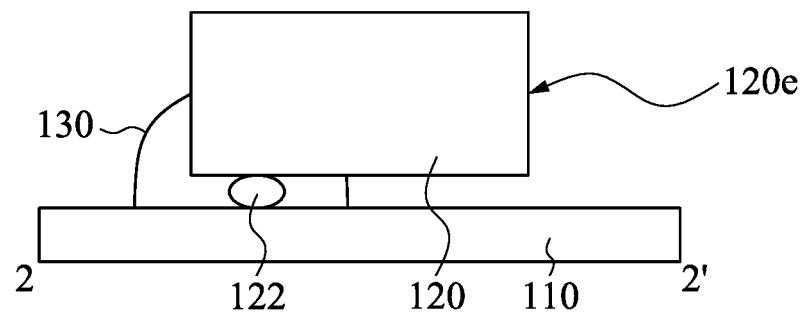
FIG. 2 is a cross-sectional view of the waterproof light emitting diode device taken along a section line 2-2' of FIG. 1 according to some embodiments of the present disclosure.

FIG. 2 is a cross-sectional view of the waterproof light emitting diode device taken along a section line 2-2' of FIG. 1 according to some embodiments of the present disclosure. As shown in FIG. 2, the waterproof layer 130 surrounds and is in contact with the contact 122 of the light emitting diode 120 to prevent the contact 122 from damage due to moisture. In some embodiments, the waterproof layer 130 includes an adhesive covering the entire contact 122 but not covering the entire light emitting diode 120. In some embodiments, the waterproof layer 130 is not in contact with the light emitting surface 120e of the light emitting diode 120, and thus does not affect light emitting characteristics of the light emitting diode 120.

Figure 3:
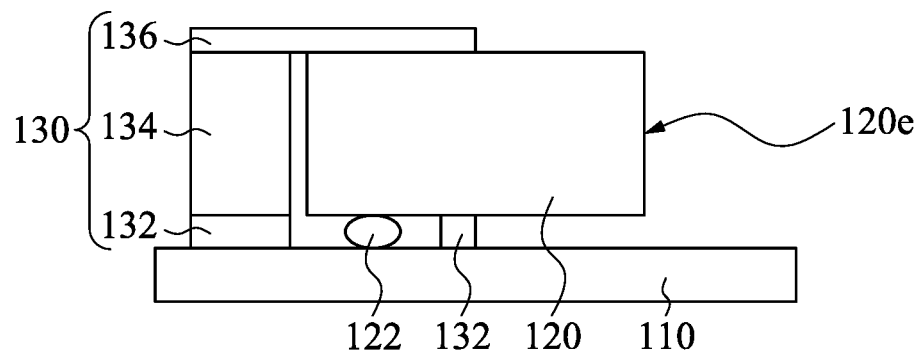
FIG. 3 is a cross-sectional view of a waterproof light emitting diode device according to some embodiments of the present disclosure.

FIG. 3 is a cross-sectional view of a waterproof light emitting diode device according to some embodiments of the present disclosure. As shown in FIG. 3, the waterproof layer 130 surrounds but is not in contact with the contact of the light emitting diode 120. The waterproof layer 130 includes a first waterproof layer 132, a second waterproof layer 134 and a third waterproof layer 136, which constitute a confined space. Specifically, the first waterproof layer 132 is adhered to the circuit board 110 and surrounds the contact 122. The second waterproof layer 134 is disposed over the first waterproof layer 132. In top view (not shown), the second waterproof layer 134 surrounds a portion of the light emitting diode 120. The third waterproof layer 136 is adhered to the second waterproof layer 134 and a top surface of the light emitting diode 120.

In some embodiments, the first waterproof layer 132 is a double-sided adhesive tape, an adhesive or a combination thereof. In some embodiments, the second waterproof layer 134 is a plastic substrate. In some embodiments, an upper surface and a bottom surface of the plastic layer are non-sticky. In other embodiments, the plastic substrate may be replaced with other waterproof substrates, such as a metal substrate or an alloy substrate. In some embodiments, the third waterproof layer 136 is a single-sided adhesive tape.

Figure 4:
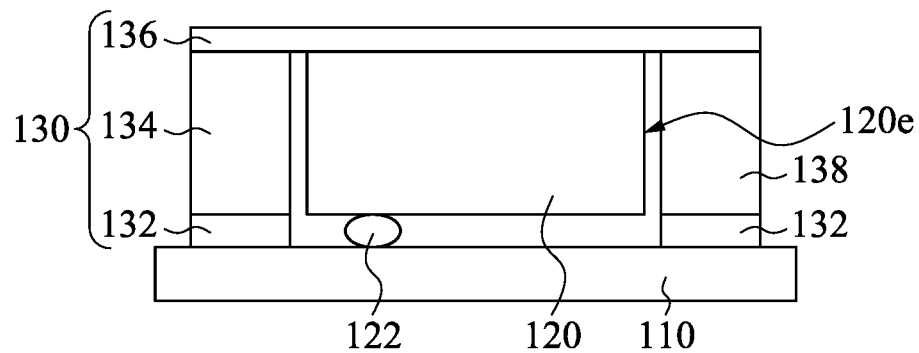
FIG. 4 is a cross-sectional view of a waterproof light emitting diode device according to some embodiments of the present disclosure.

FIG. 4 is a cross-sectional view of a waterproof light emitting diode device according to some embodiments of the present disclosure. As shown in FIG. 4, the waterproof layer 130 surrounds the entire light emitting diode 120. The waterproof layer 130 includes a first waterproof layer 132, a second waterproof layer 134, a third waterproof layer 136 and a fourth waterproof layer 138, which constitute a confined space. Specifically, the first waterproof layer 132 is adhered to the circuit board 110 and surrounds the entire light emitting diode 120. The second waterproof layer 134 and the fourth waterproof layer 138 are disposed over the first waterproof layer 132. In top view (not shown), the second waterproof layer 134 and the fourth waterproof layer 138 constitute an annular shape, which surrounds the entire light emitting diode 120. The third waterproof layer 136 is adhered to the second waterproof layer 134, the fourth waterproof layer 138 and a top surface of the light emitting diode 120. In other embodiments (not shown), the third waterproof layer is adhered to the second waterproof layer and the fourth waterproof layer but not adhered to a top surface of the light emitting diode.

In some embodiments, the first waterproof layer 132 is a double-sided adhesive tape, an adhesive or a combination thereof, and the adhesive may be waterproof adhesive. In some embodiments, the second waterproof layer 134 is a plastic substrate. The second waterproof layer 134 may be transparent or opaque. In some embodiments, the fourth waterproof layer 138 is a transparent plastic substrate. In some embodiments, the fourth waterproof layer 138 is polymethylmethacrylate. The fourth waterproof layer 138 may be in contact with or not in contact with the light emitting surface 120e. In some embodiments, the third waterproof layer 136 is a single-sided adhesive tape. In other embodiments (not shown), the second waterproof layer, the third waterproof layer and the fourth waterproof layer are made of a same material, which constitute an integrally formed waterproof case. The waterproof case may be in contact with or not in contact with a top surface of the light emitting diode.

As shown in FIGS. 1 to 4, the waterproof layer 130 covers the contact 122 or the entire light-emitting diode 120, so that ambient moisture fail to be in contact with the contact 122 to prevent it from damage due to moisture.

The present disclosure further provides a waterproof light emitting module. The light emitting module may be applied to a backlight module or a front light module. Specifically, the light emitting module includes a light guide plate. The light guide plate may be disposed over a back surface or a display surface of the display panel. Various embodiments of the waterproof light emitting module will be described below in detail.

FIGS. 5 to 14 are cross-sectional views of waterproof light emitting modules according to some embodiments of the present disclosure. The waterproof light emitting module includes a circuit board 210, a light emitting diode 220, a light guide plate 240 and a waterproof layer 230. The waterproof layer 230 is selected from the group consisting of an adhesive, a single-sided adhesive tape, a double-sided adhesive tape, a substrate, a recessed portion of the light guide plate, a portion of the circuit board and a combination thereof. The substrate may be a plastic substrate, a metal substrate, an alloy substrate, other suitable waterproof substrate or a combination thereof. In some embodiments (not shown), the waterproof light emitting module includes a plurality of light emitting diodes, and the circuit board and the light emitting diodes constitute a light bar. For the sake of clarity, each of FIGS. 5 to 14 shows a single light emitting diode 220.

Figure 5:
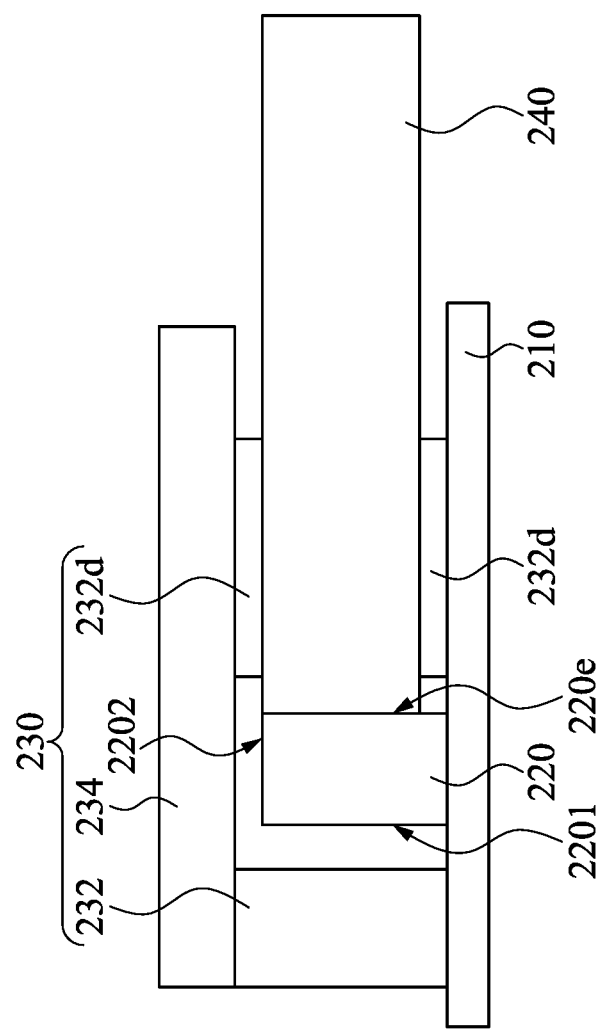

Referring to FIG. 5, the waterproof light emitting module includes a circuit board 210, a light emitting diode 220, a light guide plate 240 and a waterproof layer 230.

The light emitting diode 220 is disposed over the circuit board 210. In some embodiments, the light emitting diode 220 is side-emitting. The light emitting diode 220 has a light emitting surface 220e, a first non-light emitting surface 2201 and a second non-light emitting surface 2202. The light emitting surface 220e is opposite to the first non-light emitting surface 2201, and the second non-light emitting surface 2202 is connected between the light emitting surface 220e and the first non-light emitting surface 2201. As shown in FIG. 5, the second non-light emitting surface 2202 may also be acted as a top surface.

The light guide plate 240 is adjacent to the light emitting surface 220e of the light emitting diode 220. In some embodiments, the light guide plate 240 is fixed on the circuit board 210. In some embodiments, the light guide plate 240 is fixed on the circuit board 210 through a double-sided adhesive tape 232d.

It is noted that the waterproof layer 230 of FIG. 5 includes an adhesive 232 and a substrate 234. The adhesive 232 is in contact with the circuit board 210 and covers the first non-light emitting surface 2201 of the light emitting diode 220. The substrate 234 is in contact with the adhesive 232 and covers the second non-light emitting surface 2202 of the light emitting diode 220. In some embodiments, the waterproof layer 230 further includes a double-sided adhesive tape 232d, and the substrate 234 is fixed on the light guide plate 240 through the double-sided adhesive tape 232d. In other embodiments, the adhesive 232 may be replaced with the double-sided adhesive tape.

Figure 6:
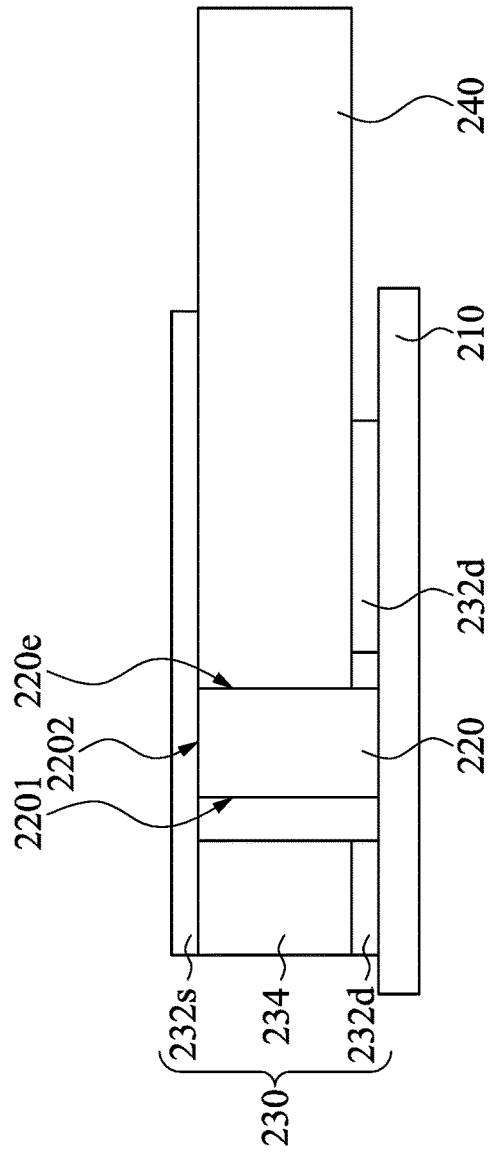

Next, as shown in FIG. 6, the waterproof layer 230 includes a single-sided adhesive tape 232s, a double-sided adhesive tape 232d and a substrate 234. The substrate 234 is fixed on the circuit board 210 through the double-sided adhesive tape 232d. The substrate 234 covers the first non-light emitting surface 2201 of the light emitting diode 220, and the single-sided adhesive tape 232s is in contact with the substrate 234 and covers the second non-light emitting surface 2202 of the light emitting diode 220. In some embodiments, the single-sided adhesive tape 232s further covers a surface of the light guide plate 240 (not marked).

Figure 7:
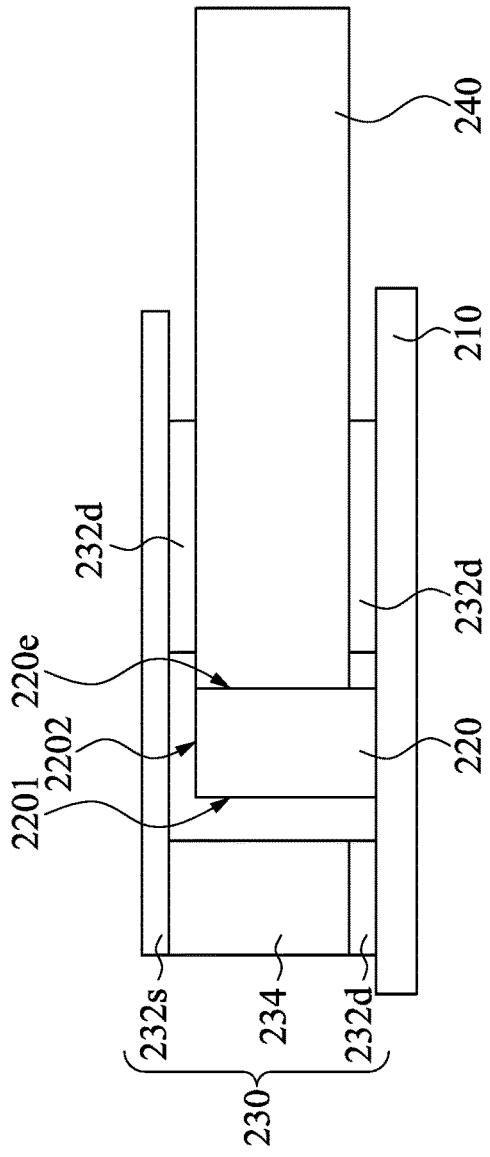

FIG. 7 is similar to FIG. 6, and the difference therebetween is that the waterproof layer 230 of FIG. 7 further includes another double-sided adhesive tape 232d disposed between the single-sided adhesive tape 232s and the light guide plate 240. In other embodiments, the other double-sided adhesive tape 232d may be replaced with a single-sided adhesive tape or an adhesive.

Figure 8:
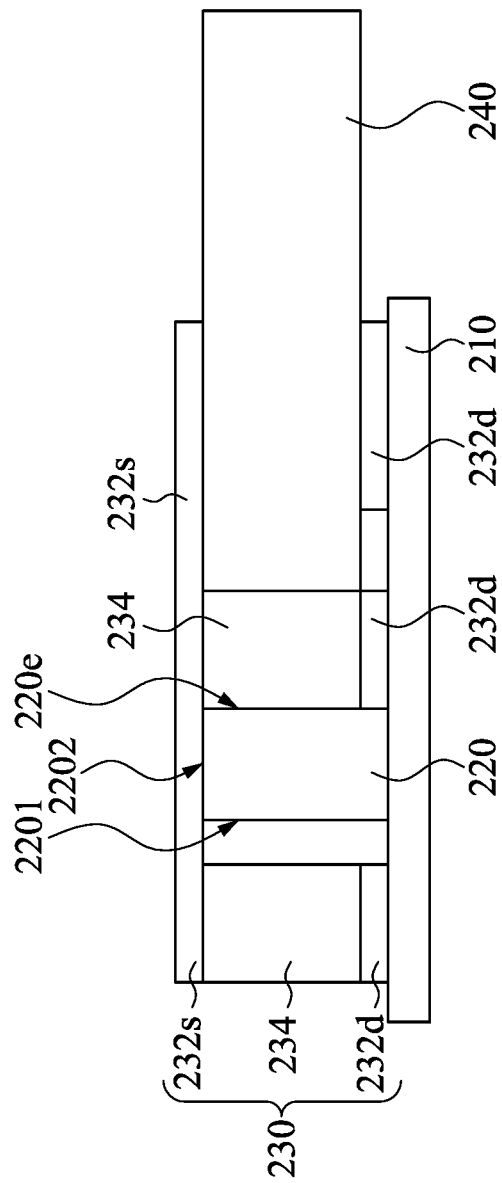

FIG. 8 is similar to FIG. 6, and the difference therebetween is that the substrate 234 of FIG. 8 further covers the light emitting surface 220e of the light emitting diode 220. In other words, the substrate 234 is disposed between the light emitting surface 220e of the light emitting diode 220 and the light guide plate 240.

Referring to FIG. 9, the waterproof layer 230 includes a double-sided adhesive tape 232d and a substrate 234. The substrate is fixed on the circuit board 210 through the double-sided adhesive tape 232d. The substrate 234 has a recessed portion 234a. The recessed portion 234a covers not only the first non-light emitting surface 2201 and the second non-light emitting surface 2202 of the light emitting diode 220 but also the light emitting surface 220e of the light emitting diode 220. In some embodiments, the recessed portion 234a is in contact with the light emitting surface 220e of the light emitting diode 220. In some embodiments, the waterproof layer 230 further includes a single-sided adhesive tape 232s in contact with the substrate 234 and covering a surface (not marked) of the light guide plate 240. In some embodiments, another double-sided adhesive tape 232d is disposed between the single-sided adhesive tape 232s and the light guide plate 240. In other embodiments (not shown), the other double-sided adhesive tape 232d may be replaced with a single-sided adhesive tape or an adhesive.

FIG. 10 is similar to FIG. 9, and the difference therebetween is that a top surface (not marked) of the substrate 234 of FIG. 10 is inclined. Specifically, the top surface of the substrate 234 extends obliquely upward from a side near the light guide plate 240 to a side away from the light guide plate 240. In some embodiments, the single-sided adhesive tape 232s is directly in contact with a surface (not marked) of the light guide plate 240.

Referring to FIG. 11, the waterproof layer 230 includes a double-sided adhesive tape 232d and a recessed portion 240a of a light guide plate 240. The light guide plate 240 is fixed on a circuit board 210 through the double-sided adhesive tape 232d. The recessed portion 240a of the light guide plate 240 covers not only the first non-light emitting surface 2201 and the second non-light emitting surface 2202 of the light emitting diode 220 but also the light emitting surface 220e of the light emitting diode 220. In some embodiments, the waterproof layer 230 further includes a single-sided adhesive tape 232s covering a surface (not marked) of the light guide plate 240.

FIG. 12 is similar to FIG. 11, and the difference therebetween is that a top surface (not marked) of the light guide plate 240 of FIG. 12 is inclined. Specifically, the top surface of the light guide plate 240 extends obliquely upward from a side near the light emitting surface 220e to a side away from the light emitting surface 220e.

Figure 13:
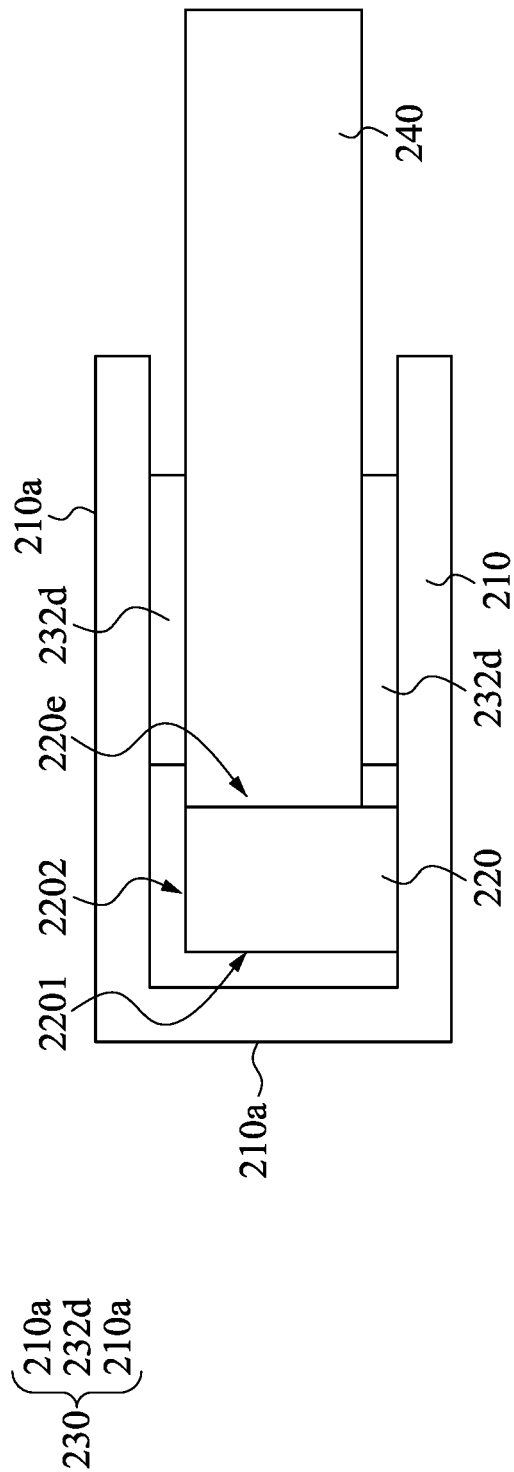

Referring to FIG. 13, the waterproof layer 230 includes a double-sided adhesive tape 232d and a portion 210a of a circuit board 210. As shown in FIG. 13, the circuit board 210 is folded into U-shape, and the portion 210a of circuit board 210 is L-shaped. The L-shaped portion 210a covers the first non-light emitting surface 2201 and the second non-light emitting surface 2202 of the light emitting diode 220. An end of the portion 210a is fixed on a light guide plate 240 through the double-sided adhesive tape 232d. In other embodiments, the extended portion 210a of the circuit board may be folded into any shape as long as it can cover the first non-light emitting surface 2201 and the second non-light emitting surface 2202 of the light emitting diode 220.

Figure 14:
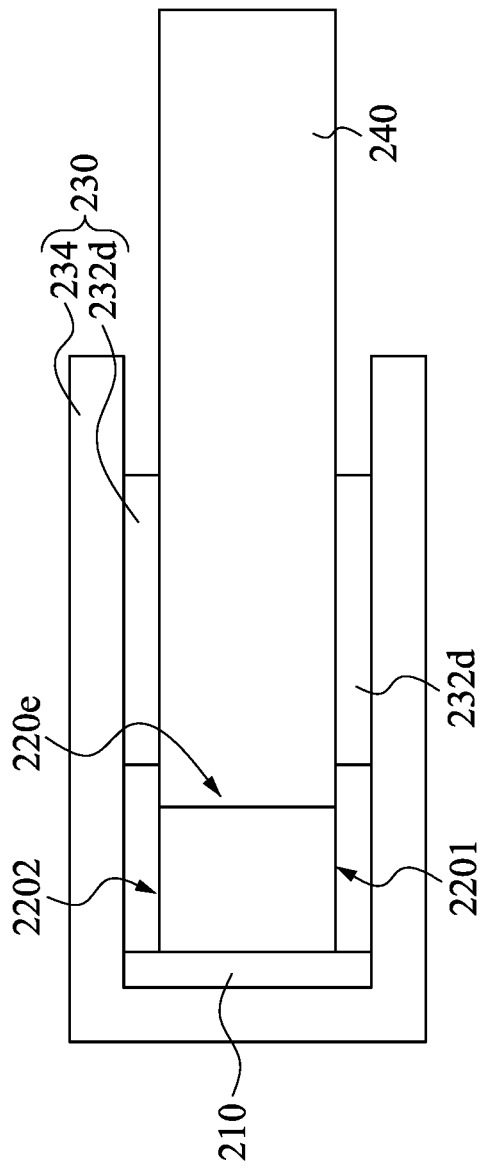

Referring to FIG. 14, the light emitting diode 220 is disposed over a circuit board 210, and the light emitting diode 220 is top-emitting. The light emitting diode 220 has light emitting surface 220e, a first non-light emitting surface 2201 and a second non-light emitting surface 2202. The first non-light emitting surface 2201 is opposite to the second non-light emitting surface 2202, and the light emitting surface 220e is connected between the first non-light emitting surface 2201 and the second non-light emitting surface 2202. The light emitting surface 220e may also be acted as a top surface. The light guide plate 240 is adjacent to the light emitting surface 220e of the light emitting diode 220.

As shown in FIG. 14, the waterproof layer 230 includes a double-sided adhesive tape 232d and a substrate 234. The substrate 234 is folded into U-shape. The substrate 234 covers not only the first non-light emitting surface 2201 and the second non-light emitting surface 2202 but also a bottom surface (not marked) of the circuit board 210. Two ends of the substrate 234 are respectively fixed on two sides (not marked) of the light guide plate 240. In other embodiments, the substrate 234 may be folded into any shape as long as it can cover the first non-light emitting surface 2201 and the second non-light emitting surface 2202 of the light emitting diode 220 and the circuit board 210.

As shown in FIGS. 5 to 14, the light emitting diode 220 is fully covered by the waterproof layer 230, and thus it can prevent the light emitting diode 220 from damage due to moisture.

Figure 15:
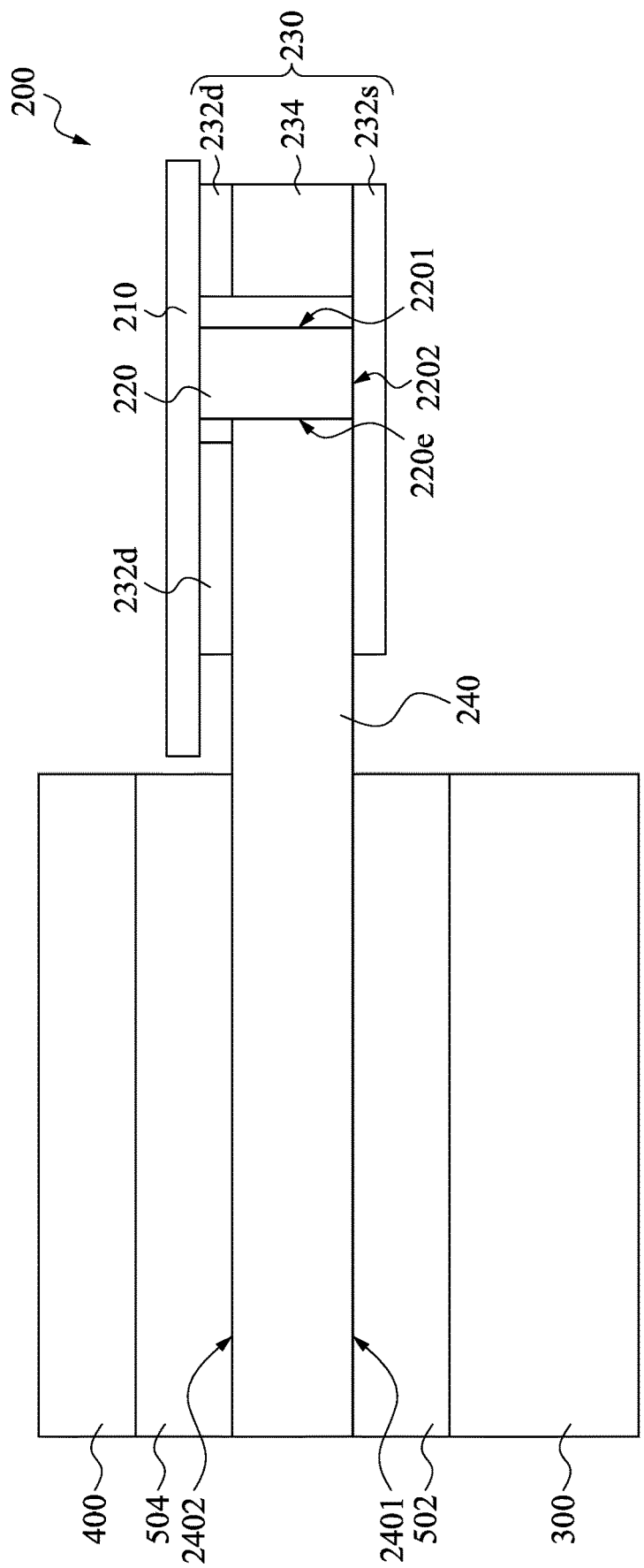
FIG. 15 is a cross-sectional view of a waterproof display device according to some embodiments of the present disclosure.

The present disclosure further provides a waterproof display device. FIG. 15 is a cross-sectional view of a waterproof display device according to some embodiments of the present disclosure. As shown in FIG. 15, the waterproof display device includes a waterproof light emitting module 200, a display panel 300 and a protective layer 400.

The waterproof light emitting module 200 may be the waterproof light emitting module 200 of FIGS. 5 to 14. The waterproof light emitting module 200 of FIG. 15 is the waterproof light emitting module of FIG. 6.

The display panel 300 is fixed on a first surface 2401 of a light guide plate 240. In some embodiments, the display panel 300 is a liquid crystal display panel an electrowetting display panel, a reflective display panel or an electrophoretic display panel. In some embodiments, the display panel 300 is fixed on the first surface 2401 of the light guide plate 240. In some embodiments, the adhesive layer 502 is an optically clear adhesive (OCA).

The protective layer 400 is fixed on a second surface 2402 of the light guide plate 240. The second surface 2402 is opposite to the first surface 2401. In some embodiments, the protective layer 400 is an anti-glare film (AG film) or a cover lens. In some embodiments, the protective layer 400 is fixed on the second surface 2402 of the light guide plate 240 through the adhesive layer 504. In some embodiments, the adhesive layer 504 is an optically clear adhesive.

As shown in FIG. 15, in the waterproof light emitting module 200, the waterproof layer 230 covers the light emitting diode 220, and thus can prevent the light emitting diode 220 from damage due to moisture.

Figure 16:
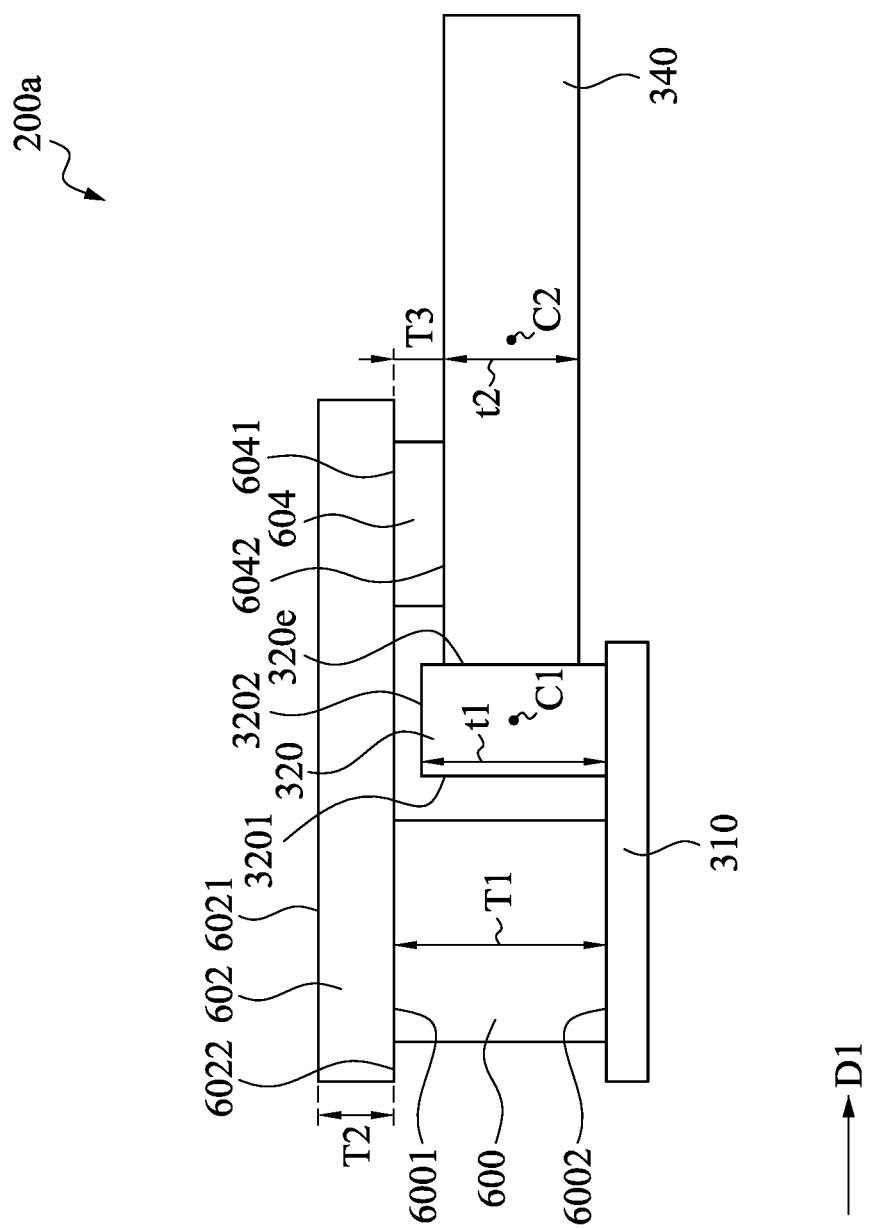
FIG. 16 is a cross-sectional view of a waterproof light emitting module according to one embodiment of the present disclosure.

FIG. 16 is a cross-sectional view of a waterproof light emitting module 200a according to one embodiment of the present disclosure. As shown in FIG. 16, the waterproof light emitting module 200a includes a circuit board 310, a light emitting diode 320, a light guide plate 340, a first waterproof layer 600, a second waterproof layer 602, and a third waterproof layer 604. The light emitting diode 320 is over the circuit board 310. The light emitting diode 320 has a light emitting surface 320e, a first non-light emitting surface 3201, and a second non-light emitting surface 3202. The light emitting surface 320e is opposite to the first non-light emitting surface 3201, and the second non-light emitting surface 3202 is between the light emitting surface 320e and the first non-light emitting surface 3201. The light guide plate 340 is adjacent to the light emitting surface 320e of the light emitting diode 320. The light emitting diode 320 is between the first waterproof layer 600 and the light guide plate 340. The second waterproof layer 602 covers the second non-light emitting surface 3202 of the light emitting diode 320. The third waterproof layer 604 is between the second waterproof layer 602 and the light guide plate 340. The combination of the first, second, and the third waterproof layers 600, 602, 604 can fix the light emitting diode 320 and the circuit board 310 to the light guide plate 340. A center C1 (e.g., a geometric center) of the light guide plate 340 is substantially aligned with a center C2 (e.g., a geometric center) of the light emitting diode 320 along a direction D1 perpendicular to the light emitting surface 320e such that light can be transported from the light emitting surface 320e of the light emitting diode 320 to the light guide plate 340 with little or no light loss. Therefore, desired optical characteristics of the waterproof light emitting module 200a are maintained.

The first waterproof layer 600 is bonded to the second waterproof layer 602 and the circuit board 310. For example, the first waterproof layer 600 is in contact with the second waterproof layer 602 and the circuit board 310 in some embodiments. Therefore, the first waterproof layer 600 can prevent ambient moisture from passing to the light emitting diode 320. In particular, the first waterproof layer 600 can prevent dust from entering the first non-light emitting surface 3201 of the light emitting diode 320 as well.

In some embodiments, a thickness T1 of the first waterproof layer 600 is in a range from about 0.5 mm to about 0.8 mm. The first waterproof layer 600 is thick enough to allow the second waterproof layer 602 be at an elevated position with regard to the light guide plate 340 to provide enough space (e.g., a vertical distance between the light guide plate 340 and the second waterproof layer 602) for disposing the third waterproof layer 604. In some embodiments, a thickness t1 of the light emitting diode 320 is in a range from about 0.3 mm to about 0.5 mm. In some embodiments, a thickness t2 of the light guide plate 340 is in a range from about 0.15 mm to about 0.35 mm. In some embodiments, a thickness T3 of the third waterproof layer 604 is in a range from about 0.1 mm to about 0.3 mm. The third waterproof layer 604 is thick enough to provide strong adherence between the light guide plate 340 and the second waterproof layer 602. As a result, the light emitting diode 320 and the circuit board 310 can be firmly fixed to the light guide plate 340. In other words, the light emitting diode 320 and the circuit board 310 are prevented from falling off the light guide plate 340.

The second waterproof layer 602 overlies the first waterproof layer 600 and the third waterproof layer 604. The first waterproof layer 600 is between the circuit board 310 and the second waterproof layer 602 to bond the second waterproof layer 602 to the circuit board 310. Therefore, the second waterproof layer 602 can prevent ambient moisture from passing to the light emitting diode 320. In particular, the second waterproof layer 602 can prevent dust from entering the second non-light emitting surface 3202 of the light emitting diode 320 as well. In some embodiments, a thickness T2 of the second waterproof layer 602 is in a range from about 0.02 mm to about 0.15 mm.

The first waterproof layer 600 has a top surface 6001 and a bottom surface 6002 opposite to the top surface 6001. At least one of the top surface 6001 and the bottom surface 6002 is adhesive. In some embodiments, the bottom surface 6002 of the first waterproof layer 600 is adhesive such that the first waterproof layer 600 can adhere to the circuit board 310. For example, the first waterproof layer 600 may be a single-sided adhesive tape. In some other embodiments, the top surface 6001 of the first waterproof layer 600 is adhesive as well such that the first waterproof layer 600 can adhere to the second waterproof layer 602. For example, the first waterproof layer 600 may be a double-sided adhesive tape or an adhesive.

The second waterproof layer 602 has a top surface 6021 and a bottom surface 6022 opposite to the top surface 6021. At least one of the top surface 6021 and the bottom surface 6022 is adhesive. In some embodiments, the bottom surface 6022 of the second waterproof layer 602 is adhesive such that the second waterproof layer 602 can adhere to the first waterproof layer 600. For example, the first waterproof layer 600 may be a single-sided adhesive tape. In particular, at least one of the bottom surface 6022 of the second waterproof layer 602 and the top surface 6001 of the first waterproof layer 600 is adhesive such that the first waterproof layer 600 and the second waterproof layer 602 can adhered to each other. At least one of the top surface 6021 and the bottom surface 6022 of the second waterproof layer 602 is non-adhesive. In some embodiments, the top surface 6021 and the bottom surface 6022 of the second waterproof layer 602 are non-adhesive. For example, the second waterproof layer 602 is a waterproof substrate, such as a plastic, a metal, a ceramic, or a combination thereof to provide enhanced structural strength of the waterproof light emitting module 200a.

The light emitting diode 320 is between the first waterproof layer 600 and the third waterproof layer 604. Therefore, the third waterproof layer 604 can prevent ambient moisture from passing to the light emitting diode 320. In particular, the third waterproof layer 604 can prevent dust from entering the light emitting surface 320e of the light emitting diode 320 as well.

The third waterproof layer 604 has a top surface 6041 and a bottom surface 6042 opposite to the top surface 6041. At least one of the top surface 6041 and the bottom surface 6042 is adhesive. In some embodiments, the bottom surface 6042 of the third waterproof layer 604 is adhesive such that the third waterproof layer 604 can adhere to the circuit board 310. For example, the third waterproof layer 604 may be a single-sided adhesive tape. In some other embodiments, the top surface 6041 of the third waterproof layer 604 is adhesive as well such that the third waterproof layer 604 can adhere to the second waterproof layer 602. For example, the third waterproof layer 604 may be a double-sided adhesive tape or an adhesive.

Figure 17:
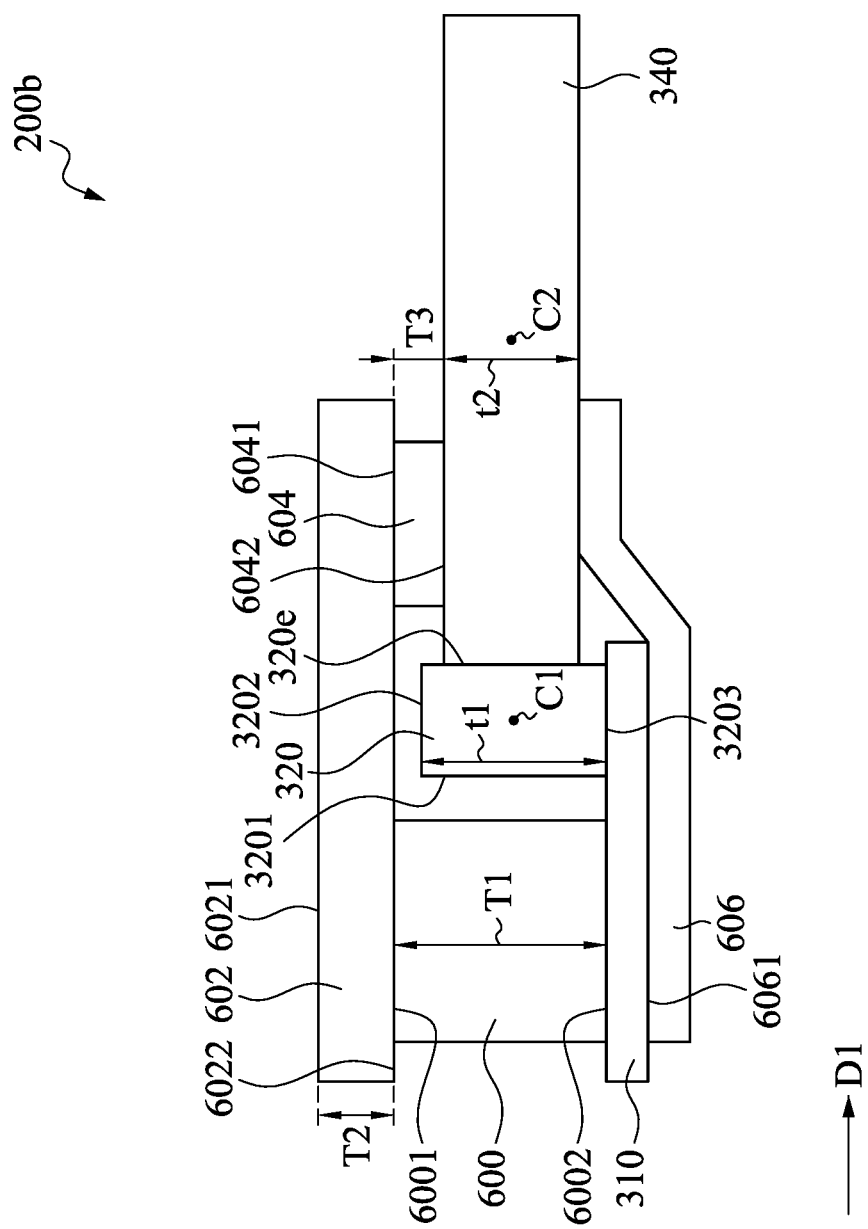
FIG. 17 is a cross-sectional view of a waterproof light emitting module according to one embodiment of the present disclosure.

FIG. 17 is a cross-sectional view of a waterproof light emitting module 200b according to one embodiment of the present disclosure. A main difference between the waterproof light emitting module 200a according to FIG. 16 and the waterproof light emitting module 200b is that: the waterproof light emitting module 200b further includes a fourth waterproof layer 606 below the circuit board 310 and the light guide plate 340. As shown in FIG. 17, the light emitting diode 320 further includes a third non-light emitting surface 3203 opposite to the second non-light emitting surface 3202. A top surface 6061 of the fourth waterproof layer 606 is adhered to the circuit board 310 and the light guide plate 340. For example, the fourth waterproof layer 606 may be a single-sided adhesive tape. Therefore, the fourth waterproof layer 606 can prevent ambient moisture from passing to the light emitting diode 320. In particular, the fourth waterproof layer 606 can prevent dust from entering the third non-light emitting surface 3203 of the light emitting diode 320 as well.

Figure 18:
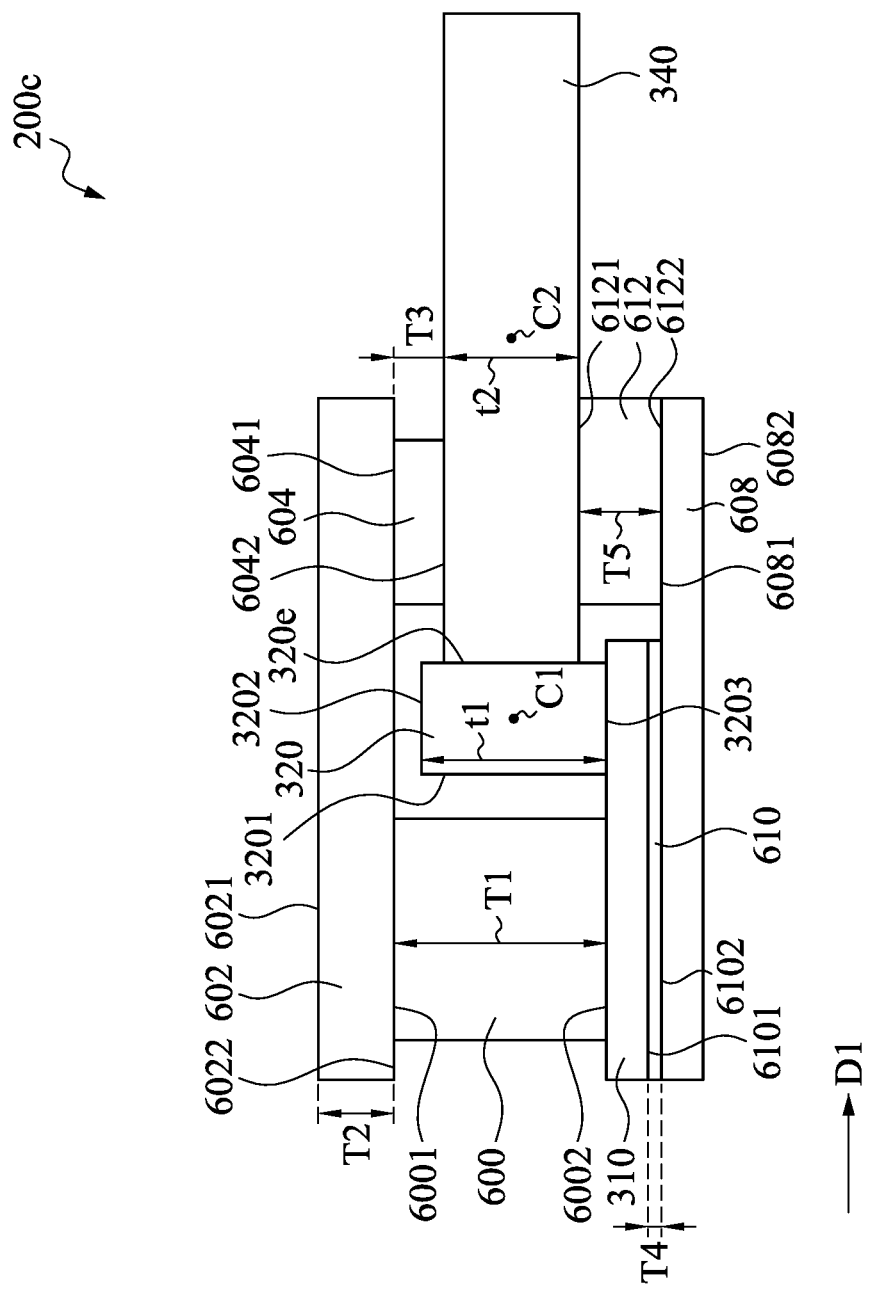
FIG. 18 is a cross-sectional view of a waterproof light emitting module according to one embodiment of the present disclosure.

FIG. 18 is a cross-sectional view of a waterproof light emitting module 200c according to one embodiment of the present disclosure. A main difference between the waterproof light emitting module 200a according to FIG. 16 and the waterproof light emitting module 200c is that: the waterproof light emitting module 200c further includes a fifth waterproof layer 608, a sixth waterproof layer 610, and a seventh waterproof layer 612. The fifth waterproof layer 608 is below the circuit board 310 and the light guide plate 340. The sixth waterproof layer 610 is between the circuit board 310 and the fifth waterproof layer 608. The seventh waterproof layer 612 is between the light guide plate 340 and the fifth waterproof layer 608. The fifth, sixth, and seven waterproof layers 608, 610, 612 can prevent ambient moisture from passing to the light emitting diode 320. In particular, the fifth, sixth, and seven waterproof layers 608, 610, 612 can prevent dust from entering the third non-light emitting surface 3203 of the light emitting diode 320 as well. In some embodiments, a thickness T4 of the sixth waterproof layer 610 is in a range from about 0.1 mm to about 0.3 mm. As a result, the sixth waterproof layer 610 is thick enough to provide strong adherence between the circuit board 310 and the fifth waterproof layer 608. In some embodiments, a thickness T5 of the seventh waterproof layer 612 is in a range from about 0.1 mm to about 0.3 mm. As a result, the seventh waterproof layer 612 is thick enough to provide strong adherence between the light guide plate 340 and the fifth waterproof layer 608.

The fifth waterproof layer 608 has a top surface 6081 and a bottom surface 6082 opposite to the top surface 6081. At least one of the top surface 6081 and the bottom surface 6082 is adhesive. In some embodiments, the top surface 6081 of the fifth waterproof layer 608 is adhesive such that the fifth waterproof layer 608 can adhere to the sixth waterproof layer 610 and the seventh waterproof layer 612. For example, the fifth waterproof layer 608 may be a single-sided adhesive tape. The sixth waterproof layer 610 has a top surface 6101 and a bottom surface 6102 opposite to the top surface 6101. In particular, at least one of the bottom surface 6102 of the sixth waterproof layer 610 and the top surface 6081 of the fifth waterproof layer 608 is adhesive such that the fifth waterproof layer 608 and the six waterproof layer 610 can adhered to each other. The seventh waterproof layer 612 has a top surface 6121 and a bottom surface 6122 opposite to the top surface 6121. At least one of the bottom surface 6122 of the seventh waterproof layer 612 and the top surface 6081 of the fifth waterproof layer 608 is adhesive such that the fifth waterproof layer 608 and the seventh waterproof layer 612 can adhered to each other. At least one of the top surface 6081 and the bottom surface 6082 of the fifth waterproof layer 608 is non-adhesive. In some embodiments, the top surface 6081 and the bottom surface 6082 of the fifth waterproof layer 608 are non-adhesive. For example, the fifth waterproof layer 608 is a waterproof substrate, such as a plastic, a metal, a ceramic, or a combination thereof to provide enhanced structural strength of the waterproof light emitting module 200*b*.

At least one of the top surface 6101 and the bottom surface 6102 of the sixth waterproof layer 610 is adhesive. In some embodiments, the top surface 6101 of the sixth waterproof layer 610 is adhesive such that the sixth waterproof layer 610 can adhere to the circuit board 310. For example, the sixth waterproof layer 610 may be a single-sided adhesive tape. In some other embodiments, the bottom surface 6102 of the sixth waterproof layer 610 is adhesive as well such that the sixth waterproof layer 610 can adhere to the fifth waterproof layer 608. For example, the sixth waterproof layer 610 may be a double-sided adhesive tape or an adhesive.

At least one of the top surface 6121 and the bottom surface 6122 of the seventh waterproof layer 612 is adhesive. In some embodiments, the top surface 6121 of the seventh waterproof layer 612 is adhesive such that the seventh waterproof layer 612 can adhere to the light guide plate 340. For example, the seventh waterproof layer 612 may be a single-sided adhesive tape. In some other embodiments, the bottom surface 6122 of the seventh waterproof layer 612 is adhesive as well such that the seventh waterproof layer 612 can adhere to the fifth waterproof layer 608. For example, the seventh waterproof layer 612 may be a double-sided adhesive tape or an adhesive.

The embodiments of the present disclosure provide the waterproof light emitting module having the first waterproof layer, the second waterproof layer, and the third waterproof layer. The center (e.g., a geometric center) of the light guide plate is substantially aligned with the center (e.g., a geometric center) of the light emitting diode along the direction perpendicular to the light emitting surface such that light can be transported from the light emitting surface of the light emitting diode to the light guide plate with little or no light loss. Therefore, desired optical characteristics of the waterproof light emitting module are maintained. In particular, the third waterproof layer is thick enough to provide strong adherence between the light guide plate and the second waterproof layer. As a result, the light emitting diode and the circuit board can be firmly fixed to the light guide plate. In other words, the light emitting diode and the circuit board are prevented from falling off the light guide plate. The waterproof light emitting module further includes the fifth, sixth, and seven waterproof layers such that ambient moisture is prevented from passing to the light emitting diode.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A waterproof light emitting module, comprising:
   a circuit board;
   a light emitting diode over the circuit board, the light emitting diode having a light emitting surface, a first non-light emitting surface and a second non-light emitting surface, wherein the light emitting surface is opposite to the first non-light emitting surface, and the second non-light emitting surface is between the light emitting surface and the first non-light emitting surface;
   a light guide plate adjacent to the light emitting surface of the light emitting diode, wherein a center of the light guide plate is substantially aligned with a center of the light emitting diode along a direction perpendicular to the light emitting surface;
   a first waterproof layer, wherein the light emitting diode is between the first waterproof layer and the light guide plate;
   a second waterproof layer covering the second non-light emitting surface of the light emitting diode; and
   a third waterproof layer between the second waterproof layer and the light guide plate.

2. The waterproof light emitting module of claim 1, wherein the first waterproof layer is bonded to the second waterproof layer and the circuit board.

3. The waterproof light emitting module of claim 1, wherein the first waterproof layer is in contact with the second waterproof layer and the circuit board.

4. The waterproof light emitting module of claim 1, wherein the second waterproof layer overlies the first waterproof layer and the third waterproof layer.

5. The waterproof light emitting module of claim 1, wherein the light emitting diode is between the first waterproof layer and the third waterproof layer.

6. The waterproof light emitting module of claim 1, wherein the first waterproof layer is between the circuit board and the second waterproof layer.

7. The waterproof light emitting module of claim 1, wherein the first waterproof layer has a top surface and a bottom surface opposite to the top surface, and at least one of the top surface and the bottom surface is adhesive.

8. The waterproof light emitting module of claim 1, wherein the second waterproof layer has a top surface and a bottom surface opposite to the top surface, and at least one of the top surface and the bottom surface is adhesive.

9. The waterproof light emitting module of claim 1, wherein the second waterproof layer has a top surface and a bottom surface opposite to the top surface, and at least one of the top surface and the bottom surface is non-adhesive.

10. The waterproof light emitting module of claim 1, wherein the third waterproof layer has a top surface and a bottom surface opposite to the top surface, and at least one of the top surface and the bottom surface is adhesive.

11. The waterproof light emitting module of claim 1, wherein a thickness of the third waterproof layer is in a range from about 0.1 mm to about 0.3 mm.

12. The waterproof light emitting module of claim 1, further comprising:

a fourth waterproof layer below the circuit board and the light guide plate, and a top surface of the fourth waterproof layer adhered to the circuit board and the light guide plate.

13. The waterproof light emitting module of claim 1, further comprising:
a fifth waterproof layer below the circuit board and the light guide plate;
a sixth waterproof layer between the circuit board and the fifth waterproof layer; and
a seventh waterproof layer between the light guide plate and the fifth waterproof layer.

14. The waterproof light emitting module of claim 13, wherein the fifth waterproof layer has a top surface and a bottom surface opposite to the top surface, and at least one of the top surface and the bottom surface is adhesive.

15. The waterproof light emitting module of claim 13, wherein the fifth waterproof layer has a top surface and a bottom surface opposite to the top surface, and at least one of the top surface and the bottom surface is non-adhesive.

16. The waterproof light emitting module of claim 13, wherein the sixth waterproof layer has a top surface and a bottom surface opposite to the top surface, and at least one of the top surface and the bottom surface is adhesive.

17. The waterproof light emitting module of claim 13, wherein the seventh waterproof layer has a top surface and a bottom surface opposite to the top surface, and at least one of the top surface and the bottom surface is adhesive.

* * * * *